(12) United States Patent
Thomas (10) Patent No.: US 9,982,703 B2
(45) Date of Patent: May 29, 2018

(54) THEFT RESISTANT ROTATABLE LOCK NUT AND LOCK BOLT ASSEMBLIES

(71) Applicant: Daniel Thomas, Richardson, TX (US)

(72) Inventor: Daniel Thomas, Richardson, TX (US)

( * ) Notice: Subject to any disclaimer, the term of this patent is extended or adjusted under 35 U.S.C. 154(b) by 0 days. days.

(21) Appl. No.: 14/844,711

(22) Filed: Sep. 3, 2015

(65) Prior Publication Data
US 2017/0067499 A1    Mar. 9, 2017

(51) Int. Cl.
*F16B 23/00* (2006.01)
*F16B 39/10* (2006.01)
*F16B 39/12* (2006.01)

(52) U.S. Cl.
CPC ............ *F16B 39/103* (2013.01); *F16B 39/12* (2013.01)

(58) Field of Classification Search
CPC ................................. F16B 39/103; F16B 39/12
USPC .................................... 411/402; 70/229–231
See application file for complete search history.

(56) References Cited

U.S. PATENT DOCUMENTS

| | | | | |
|---|---|---|---|---|
| 1,216,954 A * | 2/1917 | Wilburn | ................... | F16B 39/12 411/222 |
| 1,692,826 A * | 11/1928 | Ganz | ................... | B62D 43/007 70/231 |
| 1,767,643 A * | 6/1930 | Baird | ................... | F16B 41/005 70/231 |
| 3,693,484 A * | 9/1972 | Sanderson, Jr. | ........ | B25B 13/48 403/325 |
| 4,027,572 A * | 6/1977 | Burge | ................... | B25B 13/485 411/436 |
| 4,233,828 A * | 11/1980 | Dauenbaugh | ......... | E05B 27/083 70/383 |
| 4,742,702 A * | 5/1988 | Swertz | ................ | F16B 23/0069 411/910 |
| 5,112,176 A * | 5/1992 | McCauley | ............ | F16B 41/005 411/432 |
| 5,950,506 A * | 9/1999 | Busse | ................... | B25B 13/485 411/402 |
| 6,038,898 A * | 3/2000 | Cliff | ....................... | E05B 27/083 70/404 |
| 6,959,627 B2 * | 11/2005 | Doran | ..................... | B25B 13/06 411/402 |
| 8,820,126 B2 * | 9/2014 | Lin | ....................... | F16B 41/005 70/166 |
| 2007/0025828 A1 * | 2/2007 | Wu | ....................... | F16B 41/005 411/402 |

* cited by examiner

*Primary Examiner* — Gary W Estremsky
(74) *Attorney, Agent, or Firm* — Braxton Perrone, PLLC (57) ABSTRACT

A tamper-resistant fastener assembly having a threaded main body section, an outer protective sleeve and an internal channel housing bearings that provides rotation of the sleeve about the main body and a customized locking head and key configuration providing limited installation and removal of the fastener. The fastener can be a nut or a bolt with internal or external threading.

18 Claims, 6 Drawing Sheets

ND LOCK BOLT ASSEMBLIES

THEFT RESISTANT ROTATABLE LOCK NUT AND LOCK BOLT ASSEMBLIES

TECHNICAL FIELD

This disclosure relates generally to an apparatus for locking and securing of items of value through an improved locking nut and bolt assembly that makes destruction or tampering of the nut or bolt to remove the item of value highly unlikely. The locking nut assembly includes an outer sleeve and plurality of bearings that prevent gripping or destruction of the sleeve to enable loosening of the nut. Similarly, the locking bolt assembly includes an outer sleeve and bearings arrangement that prevents removal from the exterior of the sleeve or destruction of the sleeve to enable loosening and removal of the bolt. The combination locking nut and sleeve assembly and locking bolt and sleeve assembly are properly removable through a lock key that fits within a space formed between the lock bolt and sleeve or lock nut and sleeve.

DESCRIPTION OF RELATED ART

Various fasteners, including nuts and bolts, are available to secure a wide variety of items. Often, an item of high value may be secured to another item with a traditional fastener without regard to the fact that the item of value is exposed to the public and susceptible to theft. Vehicle parts are highly susceptible to theft for re-use or re-sale by those willing to market in stolen vehicle parts. An example of such products of value are car and truck accessories. One type of high value accessory is a custom bumper that may be purchased to enhance the performance or appearance of a truck. The owner of a truck typically purchases a high cost bumper that is affixed to the truck body with a standard nut and bolt assembly. In the alternative, the bumper may be affixed with another so-called security enhancing fastener or protection system that over time have become easily circumvented by thieves. Consumers may spend thousands of dollars on custom wheels that are secured to the vehicle by standard lug nuts or specialized lug nuts that a thief or vandal may remove with relative ease. Even standard vehicle parts are extremely expensive to replace yet historically these items are fastened and/or secured by standard fasteners or by supposed theft-prevention means that criminals have learned to circumvent. Other items, such as residential and commercial heating and cooling systems or other items located outside of a home or business or in areas accessible to the public (such as park benches, tables and the like) that are secured by traditional means are susceptible to theft. What is needed is an improved item fastening apparatus that provides a heightened level of security and is difficult to remove in public view.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DESCRIPTION OF THE EMBODIMENTS

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Lock Nut Assembly

Figure 1A:
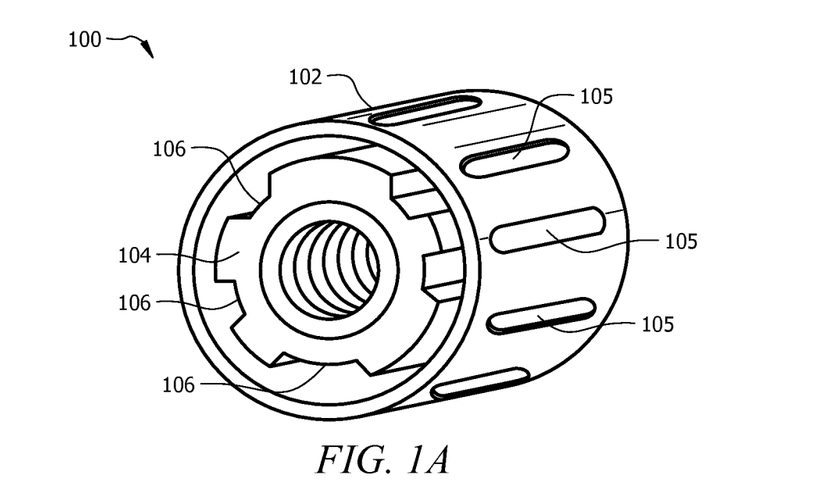
FIG. 1A is a perspective view of an embodiment of the presently described lock nut assembly.

One embodiment of the presently disclosed lock nut assembly is depicted in FIG. 1A. Lock nut assembly 100 of FIG. 1A includes a protective outer sleeve 102 and a lock nut 104. As a full assembly lock nut 104 is disposed within outer sleeve 102 with the longitudinal axis of both the nut and sleeve aligned. That is, lock nut 104 is centrally situated within outer sleeve with the axis of each member aligned along the same plane. Lock nut 104 is of a substantially cylindrical shape. Outer sleeve 102 in one embodiment is substantially cylindrical. Lock nut 104 and outer sleeve 102 may be fabricated of a durable, non-corrosive, force resistant material such as stainless steel. Other materials that contain some or all of these properties may be employed. Other suitable materials can include, but are not limited to, titanium, polymers, plastics, rubber, and other study materials such as metals.

Situated and formed within outer sleeve 104 are a plurality of ribs 105. Ribs 105 are integrated within outer sleeve 104 and formed according to known steel or metal formation techniques. Ribs 105 may be equally spaced about the circumference of outer sleeve 102 and may run in parallel with the longitudinal axis of outer sleeve 102. Ribs 105 serve to enhance the strength of outer sleeve 102 to prevent unwanted damage to sleeve 102 and access to lock nut 104 by crimping outer sleeve 102 with a device such as a vice grip, pliers, wrench or the like.

Figure 1B:
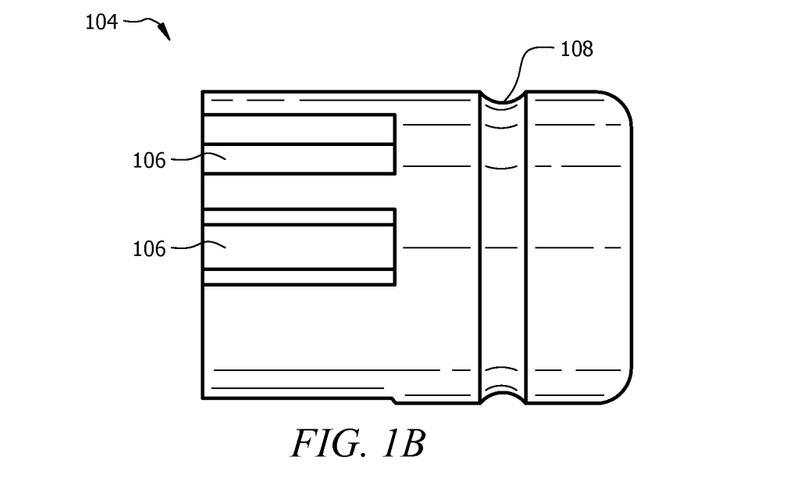
FIG. 1B is a side view of an embodiment of the presently described lock nut.

FIG. 1B is a side view of lock nut 104. In association with a proximate end of lock nut 104 are one or more key slots 106. As shown in FIG. 1A, five such key slots 106 are formed within lock nut 104. Key slots 106 are spaced at random intervals and formed within the upper body of lock nut 104. The cross sectional profile of key slots 106 may be curved, v-shaped, w-shaped or of another irregular shape. The arrangement, number and sizing of key slots 106 formed within lock nut 104 may be such that these variables are unique to a particular lock nut assembly 100. As will be discussed, a lock key conforming to the gap formed between outer sleeve 102 and lock nut 104 may be unique as a result of the arrangement of key slots 106, offering a unique key associated with a particular lock nut assembly. This uniqueness prohibits the unlocking of a particular lock nut assembly with a key associated with a different lock nut assembly. In the alternative, a finite number of key slot arrangements may be created and a particular lock nut assembly may be associated with any one of a predesignated arrangement.

Returning to FIG. 1B, located at a distal end of lock nut 104 is bearing channel 108. Bearing channel 108 is formed within the body of lock nut 104 and is of a width substantially equal to the diameter of one of a plurality of ball bearings that will occupy bearing channel 108 and of a depth less than the diameter of one of a plurality of ball bearings that will occupy bearing channel 108. That is, when ball bearings are placed within bearing channel 108, the bearings will form a ring about lock nut 104 with a portion of each ball bearing extending beyond bearing channel 108. In other words, the diameter of the ring of ball bearings within bearing channel 108 is greater than the diameter of the substantially cylindrical lock nut 104.

Figure 1C:
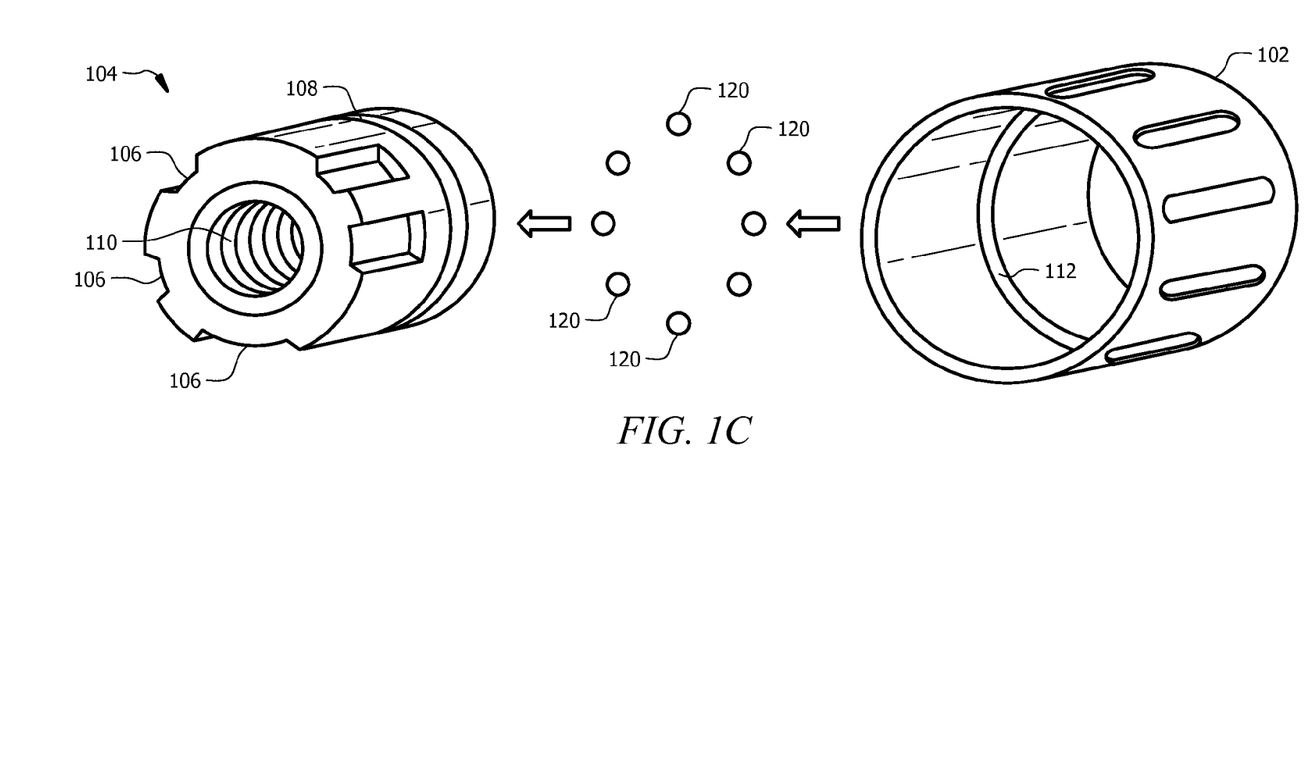
FIG. 1C is a perspective view of an embodiment of the presently described lock nut assembly.

FIG. 1C depicts the three primary components of lock nut assembly 100: lock nut 104, ball bearings 120 and outer sleeve 102. Centrally located within lock nut 104 is threaded opening 110. Threaded opening 110 is for receipt of a corresponding bolt having a gauge corresponding to threaded opening 110 of lock nut 104. The insertion of ball bearings 120 within bearing channel 108 is intended to increase the strength of the lock nut assembly 100 and provide for a freely rotatable outer sleeve 102 about lock nut 104. In order to achieve the added strength and rotation, the outer sleeve 102 is sized such that the interior side of outer sleeve 102 is in contact with ball bearings 120 within bearing sleeve 108. The outer sleeve 102 when situated about lock nut 104 with bearings 120 within bearing channel 108 serves to lock the bearings within the bearing channel and allow outer sleeve 102 to rotate freely about lock nut 104. Within the interior of outer sleeve 102 is sleeve channel 112. Sleeve channel 112 is positioned within outer sleeve 102 at a location corresponding to the location of bearing channel 108 on lock nut 104. That is, during manufacturing as lock nut 104 is inserted into outer sleeve 102, ball bearings 120 are locked into place between the two members and reside within the two part track formed by bearing channel 108 and sleeve channel 112, keeping ball bearings 120 in place during repeated use.

Ball bearings 120 are made of stainless steel or other material of sufficient strength to prevent crushing or damage upon exertion of force on outer sleeve 102 with a device such as pliers or a vice grip. The free rotation of outer sleeve 102 about lock nut 104 caused by ball bearings 120 locked within bearing channel 108 and sleeve channel 112 makes it extremely difficult for a vandal or thief to attempt to remove lock nut assembly 100 with pliers or vice grips. In addition to the lock nut assembly's resistance to force that can crush or crimp outer sleeve 102, the rotation of outer sleeve 102 about lock nut 104 prevents application of the necessary torque upon lock nut 104 to cause removal of lock nut 104 and ultimate removal of the product of interest.

In another embodiment, multiple bearing channels and corresponding sleeve channels may be disposed in parallel upon lock nut 104 and within the interior of outer sleeve 102. Multiple channels situated in this manner provide greater stability in terms of the union of lock nut 104 and outer sleeve 102 and make outer sleeve 102 less susceptible to crimping.

In one embodiment, the outer sleeve 102 extends beyond the face of the lock nut 104. Put differently, the outer sleeve 102 has a length which extends past and beyond the lock nut. Such embodiments make it more difficult to manipulate the lock nut 104 without having a proper key.

Figure 1D:
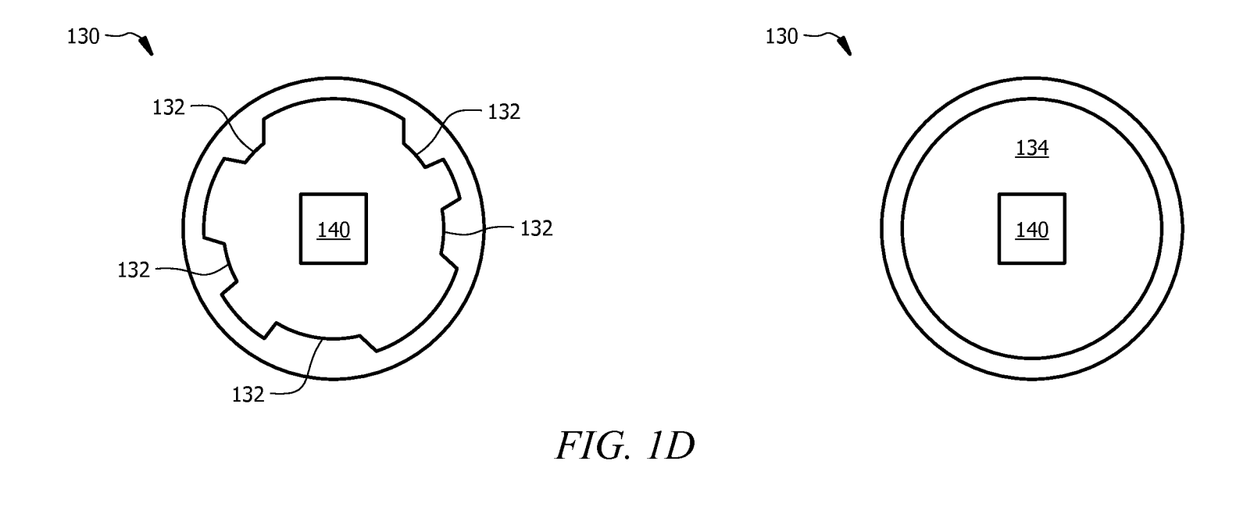
FIG. 1D are front and rear views of a lock key according to an embodiment of the presently described lock nut assembly.

FIG. 1D depicts a lock key 130 used to remove or tighten lock nut assembly as intended. Lock key 130 in one embodiment is cylindrical in shape and sized to have a diameter substantially equal to the interior diameter of outer sleeve 102. While depicted as being cylindrical, this is for illustrative purposes only and should not be deemed limiting. The lock key 130 can comprise virtually any cross sectional shape which mirrors the lock nut 104. The lock nut 104 can comprise a circular, square, hexagonal, triangular, or polygonal cross-section. Lock key 130 includes multiple teeth 132 situated along the interior perimeter lock key 130. The size, shape and location of teeth 132 along the interior perimeter of lock key 130 correspond to the size, shape and location of key slots 106 described above. Lock key 130 is of length that corresponds to the length of the body portion of lock nut 104 that in turn permits the length of each of the multiple teeth 132 to fully occupy a corresponding key slot 106. In one embodiment, key lock 130 is akin to a socket used with a socket wrench. A typical socket wrench is slid over a generic nut to form a tight fit between the socket and nut to facilitate removal or tightening of the latter. Lock key 130 may operate according to a similar principal yet lock key 130 by virtue of teeth 132 situated about the interior of or the socket of the key creates a specialized socket manufactured to remove only lock nut having an arrangement of key slots 106 that correspond to teeth 132. When placed on lock nut 104 for tightening or removal, lock key 130 slides over lock nut 104 when teeth 132 and key slots 106 are aligned with lock key 130 fitting within the gap formed between lock nut 104 and outer sleeve 102. Similar to a traditional socket, at the center of an end of lock key 130 is opening 140 sized in typical dimensions including ⅜ inch or ½ inch or other sizes to receive a typical socket wrench or other torque producing device. As shown in FIG. 1D, the lock key rear side 134 has the appearance of the rear side of a typical socket head.

In another embodiment, lock key 130 may be constructed with one or more pins extending longitudinally from the rear interior of the socket (not shown). Pin holes corresponding to the size of the pins are situated in the face of lock nut 104. The addition of pins and pin holes provides an additional layer of uniqueness of lock nut 104 and a lock key manufactured for a different lock nut having pins arranged in a manner other than as arranged for a particular nut will not remove an unmatched nut. Similarly, one or more pins may be arranged on the face of the lock nut extending perpendicularly from the lock nut and the corresponding unique lock key will have corresponding pin holes arranged in the rear interior of the socket. Thus, if the lock key's pin holes do not align with the pins extending from the lock nut, the lock key will not properly receive the lock nut, making removal of the nut more difficult.

In operation, when lock nut assembly 100 that is engaged with a bolt having a thread gauge corresponding to the thread gauge 110 of lock nut 104, lock nut assembly 100 is loosened with an appropriately sized lock key 130. Upon removal, the three main components of lock nut assembly 100, i.e., lock nut 104, outer sleeve 102 and ball bearings 120, remain as assembled. That is, ball bearings 120 remain locked within outer sleeve 102 and lock nut 104 enabling re-installation of the same lock nut assembly to fasten the same item into place or secure a different item.

Lock Bolt Assembly

Figure 2A:
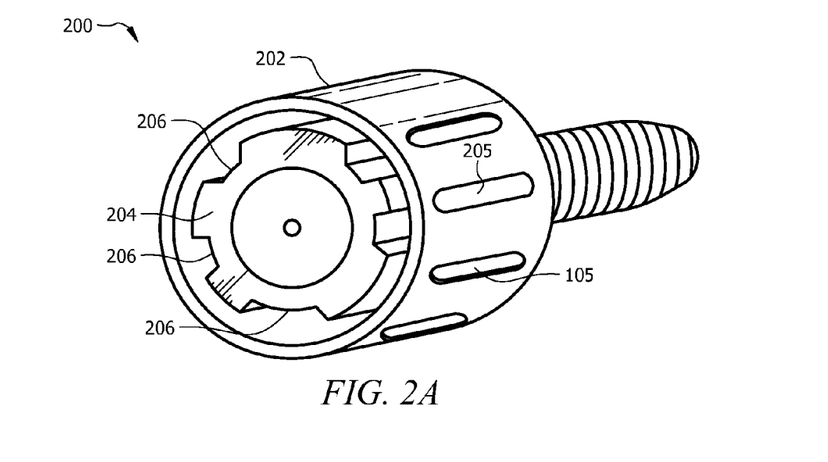
FIG. 2A is a perspective view of an embodiment of the presently described lock bolt assembly.

An embodiment of the presently disclosed lock bolt assembly is depicted in FIG. 2A. Lock bolt assembly 200 of FIG. 2A includes outer sleeve 202 and a lock bolt 204. As fully assembled, lock bolt 204 is disposed within outer sleeve 202 with the longitudinal axis of both the lock bolt 204 and outer sleeve 202 aligned. That is, lock bolt 204 is centrally situated within outer sleeve 202 with the axis of each member aligned along the same plane. Outer sleeve 202 in one embodiment is substantially cylindrical. Lock bolt 204 and outer sleeve 202 may be fabricated of a durable, non-corrosive, force resistant material such as stainless steel. The lock bolt 204 and/or the outer sleeve 202 can comprise any material discussed herein. Other materials that contain some or all of these properties may be employed.

Situated and formed within outer sleeve 204 are a plurality of ribs 205. Ribs 205 are integrated within outer sleeve 202 and formed according to known steel or metal formation techniques. Ribs 205 may be equally spaced about the circumference of outer sleeve 202 and may run in parallel with the longitudinal axis of outer sleeve 202. Ribs 205 serve to enhance the strength of outer sleeve 202 to prevent unwanted damage to sleeve 202 and access to lock bolt 204 by crimping outer sleeve 202 with a device such as a vice grip, pliers, wrench or the like.

Figure 2B:
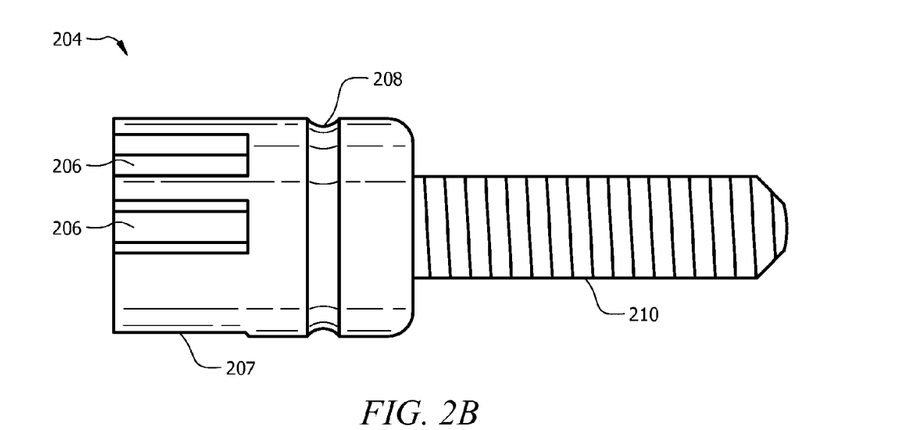
FIG. 2B is a side view of an embodiment of the presently described lock bolt.

FIG. 2B is a side view of lock bolt 204. As shown, lock bolt 204 is comprised of two main parts, lock bolt head 207 and threaded shaft 210. As depicted, in one embodiment the threaded shaft 210 comprises a tapered end to help the threading get started. Disposed within bolt head 207 of lock bolt 204 are one or more key slots 206. Bolt head 207 is of a substantially cylindrical shape. As shown in FIG. 2A, five such key slots 206 are formed within lock bolt head 207. Key slots 206 are spaced at random intervals and formed within lock bolt head 207. The cross sectional profile of key slots 206 may be curved, v-shaped, w-shaped or of another irregular shape. The arrangement, number and sizing of key slots 206 formed within lock bolt head 207 may be such that these variables are unique to a particular lock bolt assembly 200. As will be discussed, a lock key conforming to the gap formed between outer sleeve 202 and lock bolt head 207 may be unique as a result of the arrangement of key slots 206, offering a unique key associated with a particular lock bolt assembly. This uniqueness prohibits the unlocking of a particular lock bolt assembly with a key associated with a different lock bolt assembly. In the alternative, a finite number of key slot arrangements may be created and a particular lock bolt assembly may be associated with any one of a predesignated arrangement.

Returning to FIG. 2B, disposed at a distal end of lock bolt head 207 is bearing channel 208. Bearing channel 208 is formed within the body of lock bolt head 207 and is of a width substantially equal to the diameter of one of a plurality of ball bearings that will occupy bearing channel 208 and of a depth less than the diameter of one of a plurality of ball bearings that will occupy bearing channel 208. That is, when ball bearings are placed within bearing channel 208, the bearings will form a ring about lock bolt head 207 with a portion of each ball bearing extending beyond bearing channel 208. In other words, the diameter of the ring of ball bearings within bearing channel 208 is greater than the diameter of the substantially cylindrical lock bolt head 207.

Figure 2C:
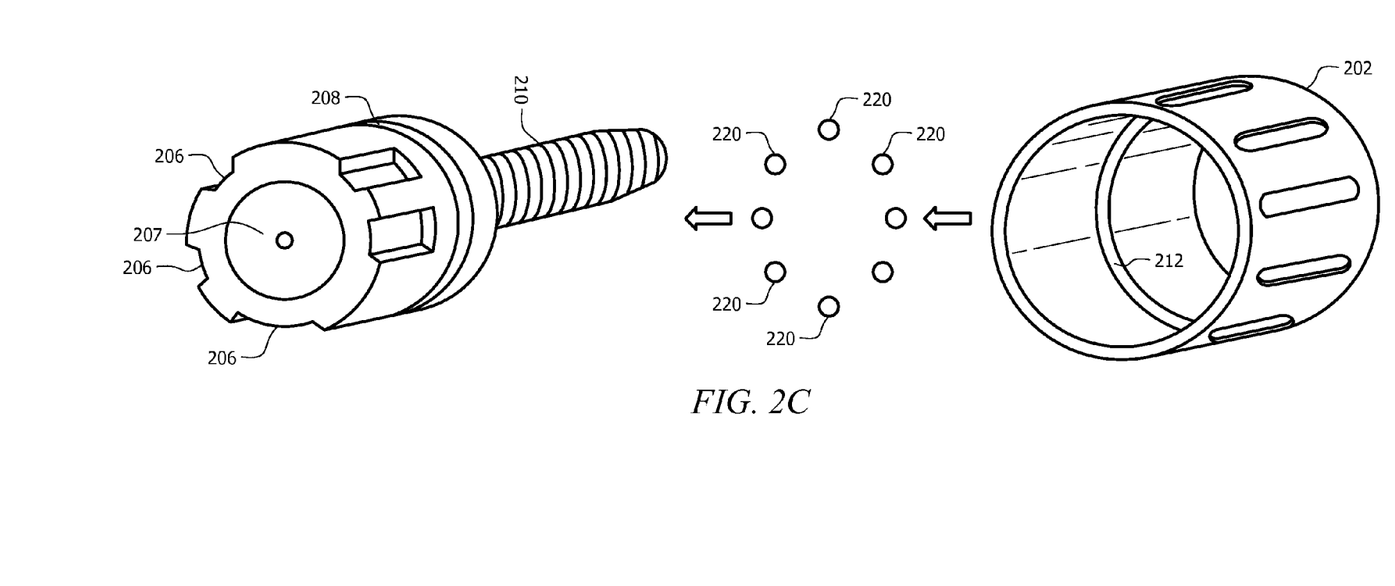
FIG. 2C is a perspective view of an embodiment of the presently described lock bolt assembly.

FIG. 2C depicts the three primary components of bolt assembly 200: lock bolt 204, ball bearings 220 and outer sleeve 202. Centrally located at one end of lock bolt 204 is threaded shaft 210. Threaded shaft 210 is for coupling with a corresponding nut having a gauge corresponding to threaded shaft 210 of lock bolt 204. The insertion of ball bearings 220 within bearing channel 208 is intended to increase the strength of the lock bolt assembly 200 and provide for a freely rotatable outer sleeve 202 about lock bolt 204, and in particular lock bolt head 207. In order to achieve this added strength and rotation, the outer sleeve 202 is sized such that the interior side of outer sleeve 202 is in contact with ball bearings 220 within bearing sleeve 208. The outer sleeve 202 when situated about lock bolt 204 with bearings 220 within bearing channel 208 serves to lock the bearings within the bearing channel and allow outer sleeve 202 to rotate freely about lock bolt 204. Within the interior of outer sleeve 202 is sleeve channel 212. Sleeve channel 212 is positioned within outer sleeve 202 at a location corresponding to the location of bearing channel 208 on lock bolt 204. That is, during manufacturing as lock bolt 204 is inserted into outer sleeve 202, ball bearings 220 are locked into place between the two members and reside within the two part track formed by bearing channel 208 and sleeve channel 212, keeping ball bearings 220 in place during repeated use.

Ball bearings 220 are made of stainless steel or other material of sufficient strength to prevent crushing or damage upon exertion of force on outer sleeve 202 with a device such as pliers or a vice grip. The rotation of outer sleeve 202 about lock bolt head 207 caused by ball bearings 220 locked within bearing channel 208 makes it extremely difficult for a vandal or thief to attempt to remove lock bolt assembly 200 with pliers or vice grips. In addition to the lock bolt assembly's resistance to force that can crush or crimp outer sleeve 202, the rotation of outer sleeve 202 about lock bolt head 207 of lock bolt 204 prevents application of the necessary torque upon lock bolt head 207 to cause removal of lock bolt 204 and ultimate removal of the product of interest.

In another embodiment, multiple bearing channels and corresponding sleeve channels may be disposed in parallel upon bolt head 207 and within the interior of outer sleeve 202. Multiple channels situated in this manner provide greater stability in terms of the union of bolt head 207 and outer sleeve 202 and make outer sleeve 202 less susceptible to crimping.

Figure 2D:
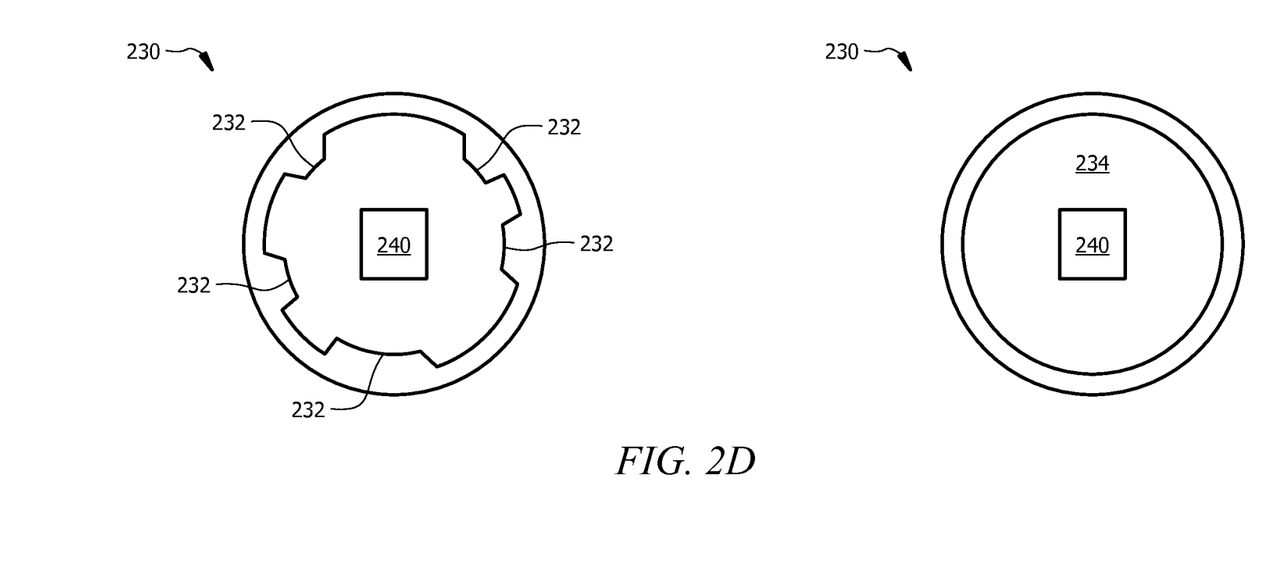
FIG. 2D are front and rear views of a lock key according to an embodiment of the presently described lock bolt assembly.

FIG. 2D depicts a lock key 230 used to remove or tighten lock bolt assembly 200 as intended. Lock key 230 in one embodiment is circular in shape and sized to have a diameter substantially equal to the interior diameter of outer sleeve 202. Lock key 230 includes multiple teeth 232 situated along the interior perimeter lock key 230. The size, shape and location of teeth 232 along the interior perimeter of lock key 230 correspond to the size, shape and location of key slots 206 formed within lock key head 207 described above. Lock key 230 is of length that corresponds to the length of lock bolt head 207 that in turn permits the length of each of the multiple teeth 232 to fully occupy a corresponding key slot 206. In one embodiment, key lock 230 is akin to a socket used with a socket wrench. A typical socket wrench is slid over a generic bolt to form a tight fit between the socket and bolt to facilitate removal or tightening of the latter. Lock key 230 may operate according to a similar principal yet lock key 230 by virtue of teeth 232 situated about the interior of or the socket of the key creates a specialized socket manufactured to remove only lock bolt having an arrangement of key slots 206 that correspond to teeth 232. When placed on lock bolt head 207 for tightening or removal, lock key 230 slides over lock bolt 204 when teeth 232 and key slots 206 are aligned with lock key 230 fitting within the gap formed between lock bolt head 207 and outer sleeve 202. Similar to a traditional socket, at the center of an end of lock key 230 is opening 240 sized in typical dimensions including ⅜ inch or ½ inch or other sizes to receive a typical socket wrench or other torque producing device. As shown in FIG. 2D, the lock key rear side 234 has the appearance of the rear side of a typical socket head.

In another embodiment, lock key 230 may be constructed with one or more pins extending longitudinally from the rear interior of the socket (not shown). Pin holes corresponding to the size of the pins are situated in the face of bolt head 207. The addition of pins and pin holes provides an additional layer of uniqueness of bolt head 207 and a lock key manufactured for a different bolt head having pins arranged in a manner other than as arranged for a particular bolt head will not remove an unmatched bolt head. Similarly, one or more pins may be arranged on the face of the bolt head extending out from the bolt head and the corresponding unique lock key will have corresponding pin holes arranged in the rear interior of the socket. Thus, if the lock key's pin holes do not align with the pins extending from the bolt head, the lock key will not properly receive the bolt head, making removal of the bolt head more difficult.

In operation, when lock bolt assembly 200 that is engaged with a nut or recessed female threaded member having a thread gauge corresponding to the gauge of threaded shaft 210 of lock bolt 204, lock bolt assembly 200 is loosened with an appropriately sized lock key 230. Upon removal, the three main components of lock bolt assembly 100, i.e., lock bolt 204, outer sleeve 202 and ball bearings 220, remain as assembled. That is, ball bearings 220 remain locked within outer sleeve 202 and lock bolt head 207 enabling re-installation of the same lock bolt assembly to fasten the same item into place or secure a different item.

At the time of purchase of the described lock nut assembly 100 or lock bolt assembly 200, the user may be provided with a key code that associates or may uniquely associate the configuration of the key slot of the assembly. In the event that a user loses lock key 130 or 230, the user may call a toll free number or log into a dedicated website or the like to provide the code key along with other indicia of authenticity such as information proving purchase of the assembly. Once the user's identity is established as legitimate, a duplicate lock key may be shipped to the user.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious various thereof is contemplated as falling within the spirit and scope of the disclosed inventions.

ADDITIONAL DESCRIPTION

The following clauses are offered as further description of the disclosed invention.

Clause 1. A locking fastener system, comprising:
(a) an outer sleeve;
(b) a substantially cylindrical nut body for insertion within the outer sleeve having an internal threaded section and having at least one slot formed within an outer edge at a proximate end of the threaded nut body;
(c) a first channel formed within the outer edge at a distal end of the threaded nut body and along at least part of the circumference of the nut body;
(d) a second channel formed within an interior side of the outer sleeve along at least part of the circumference of the interior side of the outer sleeve; and
(e) a plurality of bearings disposed within the first channel and second channel rotatably connecting the outer sleeve and the threaded nut body,
wherein the bolt head is received by the outer sleeve aligning the first channel and second channel.

Clause 2. The locking fastener system of any proceeding or preceding claim, further comprising a plurality of ribs formed within the outer sleeve.

Clause 3. The locking fastener system of any proceeding or preceding claim, further comprising a substantially cylindrical socket key having at least one tooth disposed on an interior side and of a size and location to be received by a corresponding at least one slot.

Clause 4. The locking fastener system of any proceeding or preceding claim, wherein the cylindrical socket key is of a size to be inserted into a gap formed between the outer sleeve and the nut body.

Clause 5. The locking fastener system of any proceeding or preceding claim, wherein the locking fastener system is manufactured from steel.

Clause 6. The locking fastener system of any proceeding or preceding claim, wherein arrangement of multiple slots formed within an outer edge at a proximate end of the threaded nut body are disposed at locations about the circumference of the threaded nut body.

Clause 7. The locking fastener system of any proceeding or preceding claim, wherein a key code uniquely associates a profile of the nut body and socket key.

Clause 8. The locking fastener system of any proceeding or preceding claim, further comprising an opening within the socket key to receive a torque producing device.

Clause 9. The locking fastener system of any proceeding or preceding claim, further comprising:
at least one pin located on the interior side of the socket key; and
at least one pin hole corresponding to the at least one pin located on a face of the nut body.

Clause 10. The locking fastener system of any proceeding or preceding claim, further comprising
a third channel formed within the outer edge at a distal end of the threaded nut body and along at least part of the circumference of the nut body;
a fourth channel formed within an interior side of the outer sleeve along at least part of the circumference of the interior side of the outer sleeve; and
a plurality of bearings disposed within the third channel and fourth channel rotatably connecting the outer sleeve and the nut body,
wherein the nut body is received by the outer sleeve aligning the third channel and the fourth channel.

Clause 11. A locking fastener system, comprising:
(a) an outer sleeve;
(b) a bolt body for insertion within the outer sleeve having a substantially cylindrical bolt head and an elongated threaded section and having at least one slot formed within an outer edge at a proximate end of the bolt head;
(c) a first channel formed within the outer edge at a distal end of the bolt head and along at least part of the circumference of the bolt head, the first channel disposed substantially perpendicular to the at least one slot;
(d) a second channel formed within an interior side of the outer sleeve along at least part of the circumference of the interior side of the outer sleeve; and (e) a plurality of bearings disposed within the first channel and second channel rotatably connecting the outer sleeve and the bolt head,
  wherein the bolt head is received by the outer sleeve aligning the first channel and second channel.

Clause 12. The locking fastener system of any proceeding or preceding claim, further comprising a plurality of ribs formed within the outer sleeve.

Clause 13. The locking fastener system of any proceeding or preceding claim, further comprising a substantially cylindrical socket key having at least one tooth disposed on an interior side and of a size and location to be received by a corresponding at least one slot.

Clause 14. The locking fastener system of any proceeding or preceding claim, wherein the cylindrical socket key is of a size to be inserted into a gap formed between the outer sleeve and bolt head.

Clause 15. The locking fastener system of any proceeding or preceding claim, wherein the locking fastener system is manufactured from steel.

Clause 16. The locking fastener system of any proceeding or preceding claim, wherein arrangement of multiple slots formed within an outer edge at a proximate end of the bolt head are disposed at locations about the circumference of the bolt head.

Clause 17. The locking fastener system of any proceeding or preceding claim, wherein a key code uniquely associates a profile of the nut body and socket key.

Clause 18. The locking fastener system of any proceeding or preceding claim, further comprising an opening within the socket key to receive a torque producing device.

Clause 19. The locking fastener system of any proceeding or preceding claim, further comprising:
  at least one pin located on the interior side of the socket key; and
  at least one pin hole corresponding to the at least one pin located on a face of the bolt head.

Clause 20. The locking fastener system of any proceeding or preceding claim, further comprising:
  a third channel formed within the outer edge at a distal end of the bolt head and along at least part of the circumference of the bolt head;
  a fourth channel formed within an interior side of the outer sleeve along at least part of the circumference of the interior side of the outer sleeve; and
  a plurality of bearings disposed within the third channel and fourth channel rotatably connecting the outer sleeve and the bolt head,
  wherein the bolt head is received by the outer sleeve aligning the third channel and the fourth channel.

I claim:

1. A locking fastener system, comprising:
   (a) an outer sleeve;
   (b) a substantially cylindrical nut body for insertion within the outer sleeve having an internal threaded section and having at least one slot formed within an outer edge at a proximate end of the threaded nut body;
   (c) a first channel at a distal end of the threaded nut body and along at least part of the circumference of the nut body;
   (d) a second channel formed within an interior side of the outer sleeve along at least part of the circumference of the interior side of the outer sleeve; and
   (e) a plurality of bearings disposed within the first channel and second channel rotatably connecting the outer sleeve and the threaded nut body,
   wherein the nut body is received by the outer sleeve with the first channel and second channel in alignment;
   wherein said locking fastener system further comprises
   a third channel formed along at least part of the circumference of the nut body;
   a fourth channel formed along at least part of the circumference of the interior side of the outer sleeve; and
   a plurality of bearings disposed within the third channel and fourth channel rotatably connecting the outer sleeve and the nut body,
   wherein the nut body is received by the outer sleeve aligning the third channel and the fourth channel.

2. The locking fastener system of claim 1, further comprising a plurality of ribs formed within the outer sleeve.

3. The locking fastener system of claim 1, further comprising a substantially cylindrical socket key having at least one tooth disposed on an interior side and of a size and location to be received by a corresponding at least one slot.

4. The locking fastener system of claim 3, wherein the cylindrical socket key is of a size to be inserted into a gap formed between the outer sleeve and the nut body.

5. The locking fastener system of claim 1, wherein the locking fastener system is manufactured from steel.

6. The locking fastener system of claim 1, wherein an arrangement of multiple slots formed within the threaded nut body are disposed at locations about the circumference of the threaded nut body.

7. The locking fastener system of claim 3, wherein a key code uniquely associates a profile of the nut body and socket key.

8. The locking fastener system of claim 3, further comprising an opening within the socket key to receive a torque producing device.

9. The locking fastener system of claim 3, further comprising:
   at least one pin located on the interior side of the socket key; and
   at least one pin hole corresponding to the at least one pin located on a face of the nut body.

10. A locking fastener system, comprising:
    (a) an outer sleeve;
    (b) a bolt body for insertion within the outer sleeve having a substantially cylindrical bolt head and an elongated threaded section and having at least one slot formed within an outer edge at a proximate end of the bolt head;
    (c) a first channel formed at a distal end of the bolt head and along at least part of the circumference of the bolt head, the first channel disposed substantially perpendicular to the at least one slot;
    (d) a second channel formed within an interior side of the outer sleeve along at least part of the circumference of the interior side of the outer sleeve; and
    (e) a plurality of bearings disposed within the first channel and second channel rotatably connecting the outer sleeve and the bolt head,
    wherein the bolt head is received by the outer sleeve aligning the first channel and second channel;
    wherein said locking fastener system further comprises a third channel formed along at least part of the circumference of the bolt head;
    a fourth channel formed within an interior side of the outer sleeve along at least part of the circumference of the interior side of the outer sleeve; and
    a plurality of bearings disposed within the third channel and fourth channel rotatably connecting the outer sleeve and the bolt head, wherein the bolt head is received by the outer sleeve aligning the third channel and the fourth channel.

11. The locking fastener system of claim 10, further comprising a plurality of ribs formed within the outer sleeve.

12. The locking fastener system of claim 10, further comprising a substantially cylindrical socket key having at least one tooth disposed on an interior side and of a size and location to be received by a corresponding at least one slot.

13. The locking fastener system of claim 12, wherein the cylindrical socket key is of a size to be inserted into a gap formed between the outer sleeve and bolt head.

14. The locking fastener system of claim 10, wherein the locking fastener system is manufactured from steel.

15. The locking fastener system of claim 10, wherein an arrangement of multiple slots formed within an outer edge at a proximate end of the bolt head are disposed at locations about the circumference of the bolt head.

16. The locking fastener system of claim 12, wherein a key code uniquely associates a profile of the nut body and socket key.

17. The locking fastener system of claim 12, further comprising an opening within the socket key to receive a torque producing device.

18. The locking fastener system of claim 12, further comprising:
   at least one pin located on the interior side of the socket key; and
   at least one pin hole corresponding to the at least one pin located on a face of the bolt head.

\* \* \* \* \*